United States Patent [19]
Aubry et al.

[11] Patent Number: 4,508,783
[45] Date of Patent: Apr. 2, 1985

[54] METHOD FOR THE DIFFERENTIATED HARDENING OF GLASS SHEETS, ESPECIALLY OF AUTOMOBILE WINDSHIELDS, AND TEMPERED GLASS SHEET

[75] Inventors: Claude Aubry; Jacques Chaumette, both of Thourotte; Pierre Touchon, Le Pecq, all of France

[73] Assignee: Saint-Gobain Vitrage, Courbevoie, France

[21] Appl. No.: 485,849

[22] Filed: Apr. 18, 1983

[30] Foreign Application Priority Data

Apr. 16, 1982 [FR] France .............................. 82 06596

[51] Int. Cl.³ ............................................. C03B 27/04
[52] U.S. Cl. ...................................... 428/410; 65/115; 65/351
[58] Field of Search ................... 65/115, 351; 428/410

[56] References Cited

U.S. PATENT DOCUMENTS

| 3,186,815 | 6/1965 | Jochim | 65/351 X |
| 3,251,670 | 5/1966 | Acloque | 65/115 |
| 3,251,726 | 5/1966 | Acloque | 65/115 |

FOREIGN PATENT DOCUMENTS

| 1038439 | 9/1953 | France . | |
| 704312 | 6/1952 | United Kingdom | 65/115 |
| 1212208 | 11/1970 | United Kingdom . | |

Primary Examiner—Arthur Kellogg
Attorney, Agent, or Firm—Oblon, Fisher, Spivak, McClelland & Maier

[57] ABSTRACT

The invention relates to a method of differentiated rate of hardening of a glass sheet by blowing a cooling gas in the direction of this sheet having two zones from nozzles. According to the invention, a simultaneous solidification of the glass sheet is produced at both zones of the sheet in spite of the differentiated treatments applied to establish a difference of hardening between the different zones of the sheet. Application is to the production of flat glass sheets.

5 Claims, 2 Drawing Figures

FIG_1

METHOD FOR THE DIFFERENTIATED HARDENING OF GLASS SHEETS, ESPECIALLY OF AUTOMOBILE WINDSHIELDS, AND TEMPERED GLASS SHEET

BACKGROUND OF THE INVENTION

1. Field of the Invention

The invention relates to flat glass sheets with differentiated entiated surface hardening or tempering which can be used as automobile windshields.

2. Description of the Prior Art

The desire to preserve adequate visibility for drivers if their windshield should break has resulted in the provision of a central zone of relatively small dimensions which is not hardened or only slightly hardened in an otherwise hardened windshield which fragments into small pieces when broken. This central zone does not fragment and allows visibility in spite of the breaking of the entire windshield section which surrounds this central zone.

In order to obtain such a result, the central zone and a peripheral zone are subjected to different thermal conditions. In order to avoid fragility of a glass sheet formed in this manner, due to different thermal treatments, French Pat. No. 1,038,439 proposes differentiating the heating of the two zones before a uniform hardening, whereby the central zone is less heated during hardening than the peripheral zone, on account of screens introduced into the furnace in such a manner that the glass of this central zone is at a temperature which is lower or at the most equal to that of the surrounding zone. As a variant, the entire glass sheet is heated in a uniform manner but the cooling of different portions is differentiated by accelerating the cooling of the central zone in such a manner that it solidifies before the surrounding peripheral zone. The cooling of this central zone is nevertheless slow enough that it hardens only a little or not at all.

However, such glass sheets with a slightly or non-hardened zone do not meet European Government regulations concerning flat automobile windshields, which require that the entire windshield be hardened, even if the hardening is different at the center and at the periphery.

Such regulations state that after breaking, a visibility of at least 15% of full visibility remains in a central zone of at least 20 cm × 50 cm, the center of which is approximately in front of the driver; that is, that the total of the surfaces of all the fragments of at least 2 $cm^2$ must be at least 15%, and that no fragment may have a surface area greater than 16 $cm^2$. They also require that the fragmentation in the peripheral zone be fine, that is, with 40 to 350 fragments in a square 5 cm × 5 cm and that there are no needles greater than 7.5 cm in length in this same peripheral zone.

Other patents teach performing hardening processes which cover the entire glass sheet but are differentiated according to the zones.

Thus, French Pat. No. 1,150,913 proposes a device for differentiated hardening comprising a blast box with distinct chambers opposite the various zones of the glass sheet to be hardened. These chambers communicate with the box via regulatable air entry orifices in order to adapt the amount of air arriving at the blast nozzles of the different chambers to the desired hardening effect.

French Pat. No. 1,259,550 analogously proposes cooling the hot glass sheets with jets of air, the blast pressure of which is less in the central part than at the periphery of the sheet.

French Pat. No. 1,339,535 describes a slightly different type of windshield having, like the preceeding ones, a peripheral zone of fine fragmentation and a central zone of coarse fragmentation, but in which the central zone is divided vertically by fine bands of finer fragmentation. The cooling of the glass sheet in such vertical bands is performed by blowing a gas on its two faces, and an oscillation in a vertical plane can be given to either the nozzles or to the glass sheet.

The applicant has determined that such methods are not entirely satisfactory, especially in the case of flat glass sheets, which acquire an undesired curvature and in which the differences in hardening between the center and the periphery induce alterations of the sought-after fragmentation pattern, which risks making these glass sheets unfit for automobile windshields.

SUMMARY OF THE INVENTION

The invention has the object of correcting these deficiencies by providing a method of differentiated hardening which allows the production of flat glass sheets with a fragmentation pattern which allows them to be used as automobile windshields.

To this end, the invention proposes a method of manufacturing a flat glass sheet which is highly hardened over its entire surface, but the hardening is differentiated according to the zones in order to comply with the legislation concerning automobile windshields. In this method, there is a simultaneous solidification of the glass in all of the zones of the sheet. Solidification is the point at which the temperature of the glass falls below that necessary for the introduction of permanent stresses in the glass.

The invention proposes in a first embodiment to heat the entire glass sheet uniformly, then to subject it to a strong hardening over its entire surface by blowing a cooling gas on it, whereby the cooling is advanced in certain zones, especially in the central zone, relative to the cooling in the other zones in order that the glass solidifies simultaneously at every point of the sheet so that there are no hoop stresses between the zones. The cooling advance is slight and is preferably between 0.1 and 2.5 seconds.

The glass sheet is held in a vertical position, as is conventional, and the blowing is performed simultaneously on its two faces by hardening boxes located on both sides of the sheet.

In a manner which is also known and is described in French Pat. No 1,339,535, cited above, an alternating back-and-forth movement in a vertical plane is given to the boxes.

The invention applies to the production of windshields in accordance with the regulation mentioned above.

In order to carry out the method of the invention, it is advantageous to use hardening boxes having two distinct feed chambers, one for the blow nozzles directed toward the central part and the other for those directed toward the periphery of the sheet, e.g. a box of the type described in French Pat. No. 1,150,913, cited above.

As is known, it is possible in a second embodiment, instead of differentiating the cooling, to differentiate the heating preceeding the cooling or to combine the differentiation of the heating and the differentiation of the cooling. However, the requirement of solidifying the glass simultaneously over the entire surface of the sheet must be followed in all instances, and the hardening obtained over the entire sheet must be strong.

In the second embodiment of the invention, conventional boxes with a single feed chamber are used, but screens are positioned inside the furnace which are suitable for masking the central zone, or any other part of the sheet, on its two faces.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

The following description is directed to the manufacture of a glass sheet with a central zone which, when broken, should preserve visibility at a degree greater than 15% of full visibility, and with a peripheral zone with such a hardening that the fragmentation is very fine, as stipulated in the appropriate regulations. However, other divisions of the different hardening zones are, of course, possible.

Figure 1:
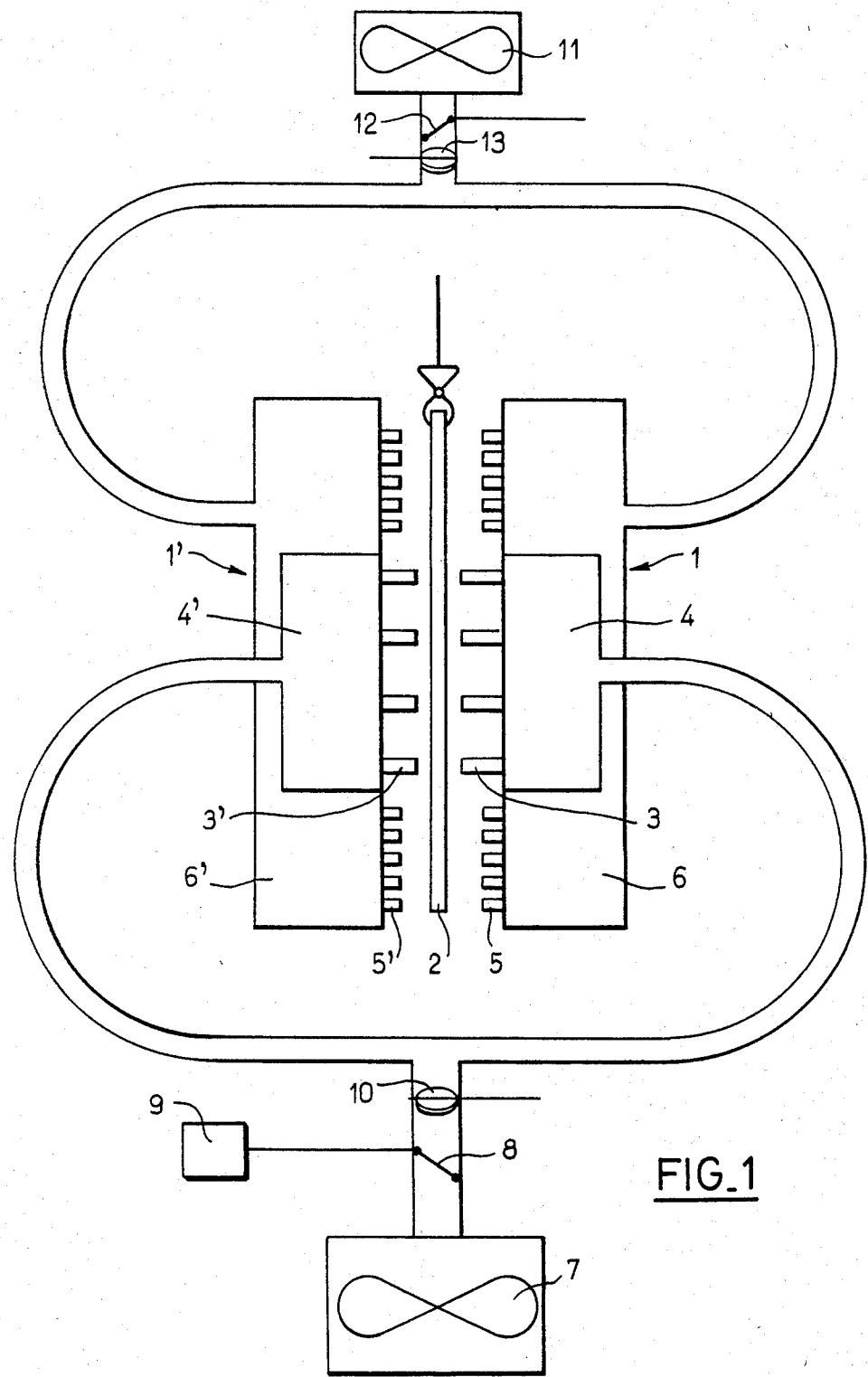
FIG. 1 shows hardening boxes with two distinct feed chambers for the blow nozzles directed toward the center and the periphery of the glass sheet.

FIG. 1 shows a blowing device for carrying out the first embodiment of the invention. It has two blowing boxes 1 and 1' positioned vertically and facing one another, leaving a space between the two boxes for the passage of glass sheets such as the sheet 2 to be hardened. Each of these boxes 1 or 1' is provided on the side facing glass sheets 2 with two types of blower nozzles. Nozzles 3 or 3' are in a central zone fed by blow gas, generally air, through feed chamber 4 or 4', and nozzles 5 or 5' in a peripheral zone fed by blow gas, also generally air, through feed chamber 6 or 6' which are distinct and fluid isolated from the preceeding feed chambers 4 and 4'.

Nozzles 3 or 3' directed toward the central part of glass sheets 2 are preferably rigid nozzles separated from each other by a significant spacing (several centimeters). They are positioned with their orifices at a small distance from the glass sheet.

The feed chambers 4 and 4' are connected to ventilator 7 and are equipped with a double system of feed control. A first feed control is a butterfly valve 8 which is either completely open or completely closed and is actuated by pneumatic jack 9 which is controlled by a logic control. A second feed control is a manually controlled damper 10 which allows the operator to regulate the blow pressure.

Nozzles 5 and 5' for cooling the sheet periphery are preferably flexible nozzles separated from each other by a small distance, e.g. on the order of one-half of the spacing separating nozzles 3,3' blowing on the central part of the sheet 2. Their orifices are further from the sheet 2 than those of the nozzles 3, 3'. Like the latter, their feed chamber 6, 6', which is in fluid isolation from the preceeding one, is connected to a ventilator 11 and equipped with a double system of control by butterfly valve 2 and damper 13.

Two examples of a device for carrying out the first embodiment of the method of the invention, one for the differentiated hardening of a sheet 5 mm thick and one for hardening a glass sheet 4 mm thick, are described below.

EXAMPLE 1

This example concerns the hardening of a glass sheet 5 mm thick.

Blow nozzles 3,3' directed toward the central part of the sheet 2 are regularly spaced from each other by a distance $L=35$ mm in a horizontal direction and by a height $h=30$ mm in a vertical direction.

The corresponding nozzles located on either side of the sheet 2 are separated by a distance of 35 mm. The inside diameter of these nozzles can be 1.5 or 2.2 mm. They are fed with cooling air at a pressure of 680 mm $H_2O$.

Blow nozzles 5, 5' directed toward the periphery of the sheet 2 are also regularly spaced from each other horizontally and vertically by a distance $L'=17.5$ mm horizontally and by a height $h'=60$ mm vertically. Their inside diameter is 5 mm and the distance separating the nozzles located on either side of the sheet and facing each other is 95 mm. They are fed with cooling air at a pressure of 370 mm $H_2O$.

For a sheet of glass preferably heated to 630° C., the blowing air directed toward the central parts starts 1.3 seconds before the blowing air directed toward the periphery.

EXAMPLE 2

This example concerns the hardening of a glass sheet 4 mm thick.

In this instance nozzles 3, 3' directed toward the center and nozzles 5, 5' directed toward the periphery of the sheet have the same spacing as in the preceeding instance, but their inside diameter is 2.8 mm for the two nozzle types. The distance separating the nozzles directed toward the central part and located on either side of the sheet is 34 mm, and it is 64 mm for the nozzles at the periphery. The feed pressure of the nozzles at the center is 480 to 500 mm $H_2O$ and that of the nozzles at the periphery is on the order of 660 mm $H_2O$. The air blowing at the center of the sheet starts 1.5 seconds before that at the periphery.

In the two examples given above, the resulting sheets remained flat in spite of the differentiated hardening, and the level of hardening was high over their entire surface.

If glass sheets are needed for some other purpose than as automobile windshields, or if the regulations change and it becomes necessary to have a difference of hardening in the various zones other than at the center and at the periphery of the sheets, it is possible to modify the positions of the different nozzle types and to install supplementary nozzle types in order to create more than two different zones.

Figure 2:
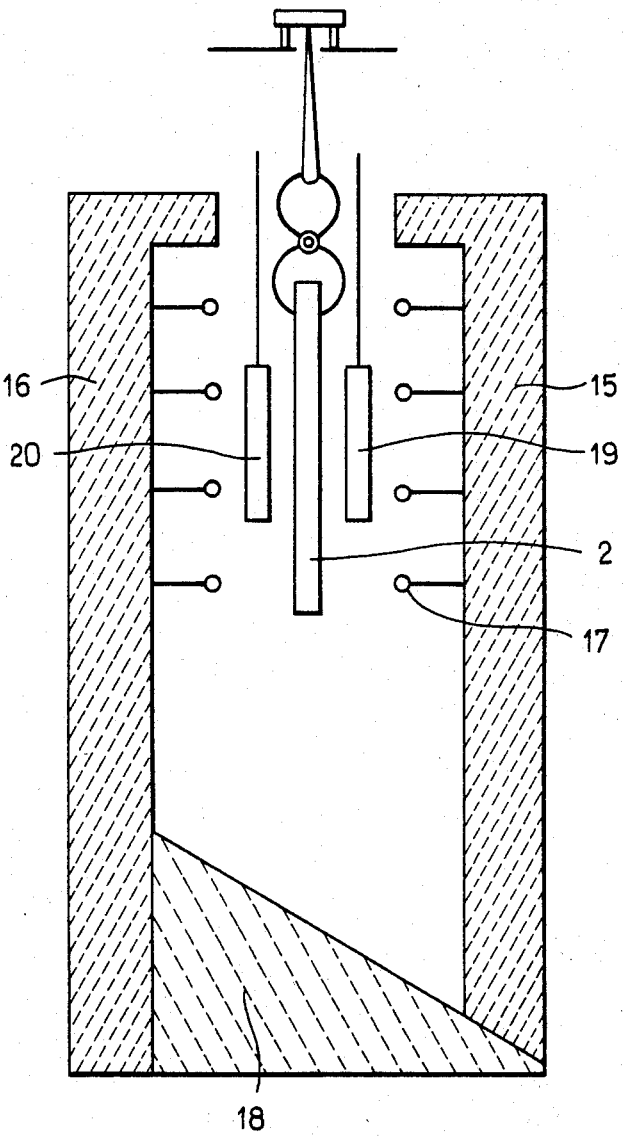
FIG. 2 shows a heating furnace for hardening glass provided with screens for masking the center of the sheets.

FIG. 2 shows a schematic view of a vertical furnace for heating glass for hardening.

This furnace includes vertical walls 15, 16, heating elements 17 and base 18. A space is left between the heating elements of each wall for the passage of glass sheets 2.

Screens 19 and 20 can be lowered inside the furnace and positioned opposite the central zone of the sheet 2 or, more generally, the zones whose temperature is to be reduced in order to obtain a lesser hardening.

These screens 19 and 20 are, for example, stainless steel plates with a surface area equal to that of the zones of the glass sheet. They are positioned parallel to the sheets at distances on the order of 10 to 15 mm from the faces of these sheets when they are in service.

These screens 19 and 20 are not put in place until the end of heating period of the sheets, e.g. in the last 15 to 25 seconds of a heating step which lasts approximately 150 seconds. The glass thus comes out of the furnace with a central zone at approximately 630° or 640° C. and a peripheral zone at approximately 650° or 660° C. The temperature difference between the two zones is therefore on the order of 20° to 30° C. at the most.

The glass sheets are then subjected to a blowing which starts at the same moment and extends over their entire surface. In this case the blow boxes have a single feed chamber.

It is also possible to obtain differences of hardening between the different zones of a glass sheet with simultaneous solidifying of the glass at all the points of the sheet by combining the action of a heating step differentiated according to the zones and the action of a blowing step which is intermittent in time for certain zones.

The invention therefore furnishes a method which is simple and easy to perform with elements known from the prior art for subjecting the different zones of a glass sheet to a differentiated hardening, e.g. the central part and the periphery, while assuring the flatness of these sheets and a fragmentation pattern in conformity with the regulations for automobile windshields.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of differentially tempering a flat glass sheet so as to harden the entire surface of said sheet, said sheet including a central zone and a peripheral zone having mutually different degrees of surface hardening, said method including steps of:

uniformly heating said entire glass sheet to a degree sufficient for tempering to occur upon cooling;

rapidly cooling said central zone at a first rate sufficient to temper said glass sheet; and subsequent to beginning said cooling of said central zone, rapidly cooling said peripheral zone at a second rate sufficient to temper said glass sheet, said second rate being greater than said first rate, wherein said cooling steps are performed such that both of said zones of said glass sheet are simultaneously solidified.

2. The method of claim 1 wherein the degree by which said cooling step in said central zone is begun between 0.1 and 2.5 seconds before said cooling step in said peripheral zone, whereby visibility through said sheet, after fragmentation, is at least 15% of visibility before fragmentation.

3. The method of claim 1 wherein said cooling steps are performed by holding said sheet vertically, positioning air blowing boxes on both sides of said sheet so as to blow cooling air over said sheet, and vertically reciprocating said blowing boxes.

4. The method of claim 1 wherein said cooling steps are carried out over both of said zones by blowing air over said sheet, and are differently carried out for said two zones in a manner such that:

(a) visibility through said central zone of said sheet, after fragmentation, is at least 15% of visibility before fragmentation; and (b) the glass of said peripheral zone, after fragmentation, shatters into between 40 and 350 fragments per 5 $cm^2$ of said sheet and with fragment pieces no larger than 7.5 cm in length.

5. Glass sheet characterized in that it presents a central zone of at least 20 cm×50 cm, having after fragmentation a visibility of at least 15% of visibility before fragmentation, this ratio being determined by the total of the surfaces of all fragments of at least 2 $cm^2$ divided by the total surface of the central zone, no fragment in this zone being allowed to have a surface area greater than 16 $cm^2$, and characterized in that it presents also a peripheral zone having after fragmentation in a square of 5 cm×5 cm, from 40 to 350 fragments, having no needles greater than 7.5 cm in length, said glass sheet being flat, wherein said glass sheet has no hoop stresses between said central and peripheral zones.

* * * * *